United States Patent [19]

Schweinfurth

[11] Patent Number: 5,132,135
[45] Date of Patent: Jul. 21, 1992

[54] PROCESS FOR PRESERVING RAW COFFEE EXTRACT

[75] Inventor: Hermann Schweinfurth, Bremen, Fed. Rep. of Germany

[73] Assignee: Jacobs Suchard AG, Zurich, Switzerland

[21] Appl. No.: 261,599

[22] Filed: Oct. 24, 1988

[30] Foreign Application Priority Data

Nov. 2, 1987 [DE] Fed. Rep. of Germany ....... 3737109

[51] Int. Cl.$^5$ ............................................... A23F 5/00
[52] U.S. Cl. .................................... 426/385; 426/471; 426/594
[58] Field of Search ........................ 426/385, 471, 594

[56] References Cited

U.S. PATENT DOCUMENTS

| | | |
|---|---|---|
| 1,175,091 | 3/1916 | von Vietinghoff ............. 426/433 X |
| 3,404,007 | 10/1968 | Muller . |
| 3,443,961 | 5/1969 | Kaleda et al. . |
| 3,554,760 | 1/1971 | Sienkiewicz et al. . |
| 3,573,060 | 3/1971 | Casten . |
| 3,798,342 | 3/1974 | Huste . |
| 3,962,028 | 6/1976 | Walsh ................................. 159/6.2 |
| 4,081,563 | 3/1978 | Hudak et al. . |
| 4,521,438 | 6/1985 | Zeller ............................... 426/422 X |

FOREIGN PATENT DOCUMENTS

| | | |
|---|---|---|
| 0108038 | 9/1983 | European Pat. Off. . |
| 2504434 | 8/1976 | Fed. Rep. of Germany . |
| 2390107 | 5/1977 | France . |
| 59-41376 | 10/1984 | Japan . |
| 167161 | 7/1934 | Switzerland . |
| 630153 | 10/1949 | United Kingdom . |

OTHER PUBLICATIONS

Sivetz et al, Coffee Processing Technology, vol. I, 1963, Avi: Westport, Conn., pp. 564–572.
Sivetz et al, Coffee Technology, 1979, Avi:Westport, Conn., pp. 373–375.
"Preparation of Edible Natural Antioxidizing Agent" by Nihon Rikagaku Yakuhin, K.K., *Patent Abstracts of Japan*, vol. 8, No. 145 (c–232) [1582] Jul. 6, 1984.
Clarke et al., *Coffee*, vol. 2: "Technology" (1987), pp. 215–216.
W. H. J. M. Van Pelt, "The Concentration of Coffee Extracts to High Product Concentrations", ASIC, 8 Colloque, Abidjan, 1977, pp. 211–216.

*Primary Examiner*—Joseph Golian
*Attorney, Agent, or Firm*—Burns, Doane, Swecker & Mathis

[57] ABSTRACT

The present invention relates to a process for preserving raw coffee extract, a dry concentrate of the raw coffee extract being prepared, wherein the raw coffee extract is concentrated in a first process stage to 30 to 40 g of dry matter/100 ml of extract and is then dried in a further process stage, the storage of the dry concentrate taking place with exclusion of oxygen and water.

5 Claims, 1 Drawing Sheet

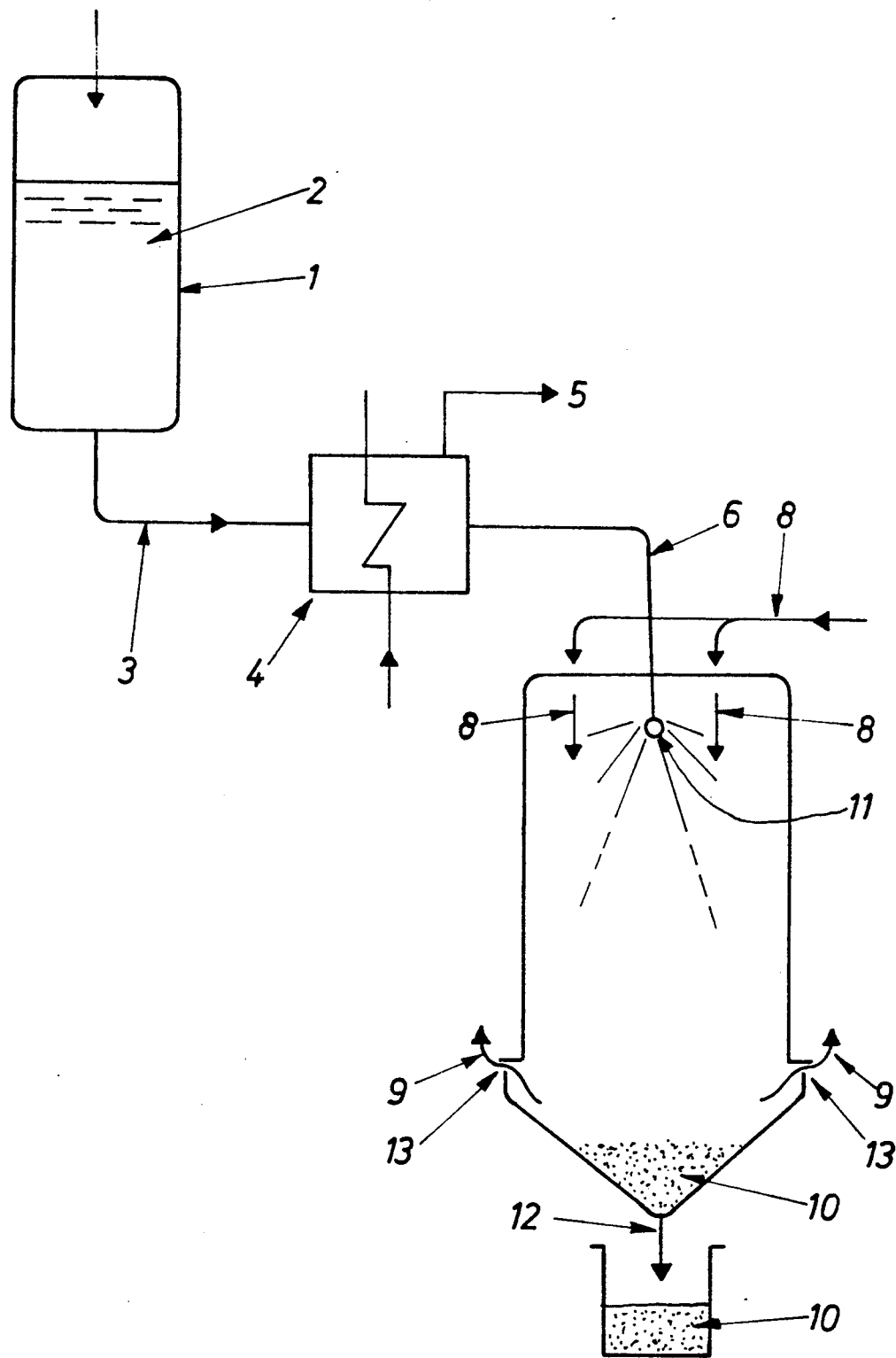

PROCESS FOR PRESERVING RAW COFFEE EXTRACT

BACKGROUND OF THE INVENTION

1. Field of the Invention

The invention relates to a process for preserving raw coffee extract.

Raw coffee extract is an important and immediate factor in the manufacture of special coffee formulations.

2. Description of the Related Art

EP-B-0,008,398 has disclosed a process for decaffeinating coffee, wherein caffeine is extracted from the raw coffee by means of an aqueous caffeine-free raw coffee extract solution (equilibrium solution). The equilibrium solution (raw coffee extract) enriched in caffeine is passed through a preloaded activated carbon adsorber, the caffeine being adsorbed selectively. It is then only necessary to dry the beans thus decaffeinated.

The cafffeine-free raw coffee bean extract used in EP-B-0,008,398 contains coffee constituents—apart from caffeine —in such concentrations that nothing other than caffeine is dissolved out of the coffee beans, since the concentrations in an aqueous solution are in equilibrium with the concentrations in the coffee bean.

In the text which follows, raw coffee extract and equilibrium solution are to be understood as caffeine-containing raw coffee extract and decaffeinated raw coffee extract respectively.

In the said continuous decaffeination process according to EP-B-0,008,398, the raw coffee extract is used always at about 80° C. in the process. The temperature of about 80° C. is necessary for two reasons:

1. it allows a considerably accelerated diffusion of caffeine, and
2. it prevents microbiological spoilage of the solution.

At temperatures below about 60° C., rapid growth of organisms can occur in the solution (fermentation). The constituents of the solution are altered, leading to disadvantageous impairment of the taste of the coffee treated with the solution. In this case, the spoiled equilibrium solution must be discarded an da new solution must be prepared. In addition to a considerable loss of time, the loss in value due to the discarded extract solution represents a considerable cost factor.

In the event of prolonged interruptions in operation, the equilibrium solution must therefore be held at a constant temperature of about 80° C. in special tanks. Evaporation losses of water must be continuously made up. This type of storage is very energy-consuming and prone to faults. Fluctuations in the temperature and concentration of the extract can cause adverse changes in the aroma of the raw coffee extract and of the coffee treated with the extract.

SUMMARY OF THE INVENTION

It is now the object of the present invention to provide a process for preserving raw coffee extract, which allows storage of the raw coffee extract without a disadvantageous impairment of the organoleptic properties of the raw coffee extract.

This object is achieved in a surprisingly simple manner in accordance with the present invention.

It has been found that the preparation of a dry concentrate from raw coffee extract in two drying stages in series is very advantageous. The dry concentrate of the raw coffee extract can be stored in air-tight and water vapour-tight containers for a period of two years, without significant changes in the coffee constituents occurring.

Preferably, the first process stage is carried out in a falling-film evaporator at temperatures from 80° C. to 50° C.

Various drying devices such as, for example, spray driers or freeze-drying units are suitable for carrying out the subsequent process stage.

In a spray drier, the concentrated raw coffee extract is sprayed, for example by means of pressure nozzles, and dried with dry air at about 210° C. to 250° C. in co-current flow.

In freeze-drier units, drying of the concentrated raw coffee extract takes place after deep-freezing. The deep-frozen concentrated raw coffee extract (about −40° C.) is dried in a vacuum of 0.5 mbar with supply of heat (40° C. to 90° C.) by sublimation of the water. The residual moisture content of the dry concentrate is preferably below 4% by weight.

For preserving the quality of the dry concentrate, it has proved to be advantageous to store it in an inert gas atmosphere.

When a new aqueous raw coffee extract (equilibrium solution) is then required, for example when the decaffeination unit is restarted, the dry concentrate quantity corresponding to the desired concentration is added to water of about 80° C. in a stirred container. Within a few minutes, this gives the desired extract and the unit can thus be started, without additional solids losses arising in the raw coffee beans.

BRIEF DESCRIPTION OF THE DRAWINGS

The sole figure is a schematic diagram illustrating the process of the present invention.

DETAILED DESCRIPTION OF THE PREFERRED EMBODIMENTS

Aqueous raw coffee extract, which can be preserved by the process according to the present invention, is obtained, for example, by adding preswollen raw coffee beans (about 55% water content) to a defined quantity of water. By diffusion of water-soluble raw coffee constituents from the beans, the water is enriched with these constituents. If the raw coffee beans are removed when the concentration of the coffee constituents in the aqueous solution remains constant, and preswollen raw coffee beans are then again introduced, this concentration can be further increased. If this procedure is repeated more than once, an aqueous solution is finally obtained in which the concentration of coffee constituents can virtually no longer be changed. This solution is in diffusion equilibrium with the solution in the interior of the preswollen raw coffee beans. The concentration of water-soluble raw coffee constituents is then between 16 and 22 g/100 ml of solution.

Caffeine can be selectively removed from this raw coffee extract (equilibrium solution) by means of, for example, preloaded activated carbon.

The process according to the invention is explained in more detail below by reference to an example:

EXAMPLE a) Preparation of a dry concentrate of raw coffee extract:

On a pilot scale, 10 kg of Colombian raw coffee were extracted twice with a total of 50 litres of water each time at 85° C. to 90° C.

The combined extracts were concentrated to about 30% dry matter (Centri-Term, CT 1 B, manufactured by alfa Laval). The extract was then prefrozen to −33° C. to −35° C. in freezing dishes.

The temperature was brought to −60° C. by means of dry ice, nd the now solid extract was ground in a cooled ice chamber mill. The ground material was dried for 15 hours in the freeze drier (G 06, manufactured by Leybold-Heraeus). This gave a dry concentrate having a moisture content of about 3%.

b) Raw coffee treatment:

100 g of Colombian raw coffee were treated with 100 ml of water and swollen for 90 minutes at 90° C. (thermostat bath) in a rotary evaporator.

The swollen raw coffee was introduced into a circulation apparatus, consisting of a funnel-shaped extraction vessel with jacket heating and installed slotted frit, a circulation pump and a thermostat.

200 ml of raw coffee extract were prepared from 40.0 g of dry concentrate, prepared according to Example a), and 126 ml of water. The solution was likewise introduced into the preheated circulation apparatus and circulated by pumping for six hours at 80° C. The extract was then drained off and the treated raw coffee was re-dried for 50 minutes to its original moisture content.

In addition, 100 g of Colombian raw coffee were swollen with 100 ml at 90° C. for 90 minutes and immediately redried without further treatment.

Treated raw coffee and untreated Colombian raw coffee were roasted in a fluidized bed (360° C.; 90 seconds).

c) Taste testing and result:

The roasted samples were ground. Boiling water was poured on, and series of the samples were tasted. No significant differences were detectable in the sensory assessment between the samples, which had been prepared from raw coffee only swollen with water, and the samples, which had been prepared from raw coffee pretreated with the extract solution obtained from dry concentrate.

Details of the process according to the invention for preserving raw coffee extract are described by way of example, with reference to the attached drawing:

The aqueous raw coffee extract 2 is transported from a stock tank 1 through a line 3 to a falling-film evaporator 4. In the evaporator 4, water from the raw coffee extract is converted into the gaseous state by supply of heat and removed as water vapour 5. In this stage, the aqueous raw coffee extract is concentrated up to 30 to 40 g of dry matter100 ml of extract. The falling-film evaporator is connected via a line 6 to a spray drier. The line 6 lads into the interior of the spray drier and ends there in the spray device 11. The concentrated raw coffee extract is transported through this line 6 to the second process stage. The spray device 11 can, for example for atomizing the material to be dried, have a nozzle or an atomizing disk. It is located in the upper region of the interior of the spray drier and permits atomizing or nebulizing of the extract. The water is removed from the atomized or nebulized extract in by means of hot dry air streams 8 in co-current flow which are at a temperature from 210° C. to 250° C. and are introduced in the upper region of the spray drier. The air enriched with water vapour escapes at special outlet openings in the lower part of the spray drier. The spray-dried concentrate can be taken off at the bottom of the spray drier through an opening 12.

I claim:

1. A process for providing an aqueous decaffeination agent for decaffeinating raw coffee, said process comprising the steps of:
   (a) subjecting an aqueous raw coffee extract solution to a first concentration step in a falling-film evaporator at a temperature of form 50° C. to 80° C. to obtain a raw coffee extract solution with a concentration of 30 to 40 g dry matter/100 ml of the raw coffee extract solution;
   (b) subjecting said raw coffee extract solution to a second concentration step employing a spray drier or a freeze-drying unit to obtain a dry concentrate of the raw coffee extract having a moisture content of less than 4% by weight;
   (c) storing the dry concentrate of the raw coffee extract produced according to the process steps (a) and (b) with the exclusion of oxygen and water; nd
   (d) mixing said dry concentrate with water for the preparation of the aqueous decaffeination agent.

2. The process of claim 1 wherein the spray drier is operated within the temperature range of from 210° to 250° C.

3. The process of claim 2 wherein the raw coffee extract is contacted with a cocurrent flow of dry air in the spray drier.

4. The process of claim 1 wherein the freeze-drying unit is operated under a vacuum of about 0.5 mbar and provided with a supply of heat to sublimate water from the raw coffee extract.

5. The process of claim 1 wherein the aqueous raw coffee extract contains from 16 to 22 grams of dry matter per 100 ml of extract.

* * * * *